(12) United States Patent
Lin et al.

(10) Patent No.: US 9,939,071 B2
(45) Date of Patent: Apr. 10, 2018

(54) WATERWAY SWITCH AND ON-OFF MECHANISM

(71) Applicant: XIAMEN SOLEX HIGH-TECH INDUSTRIES CO., LTD., Xiamen, Fujian (CN)

(72) Inventors: Fengde Lin, Fujian (CN); Tianming Wang, Fujian (CN); Mingfu Zhang, Fujian (CN); Wenxing Chen, Fujian (CN)

(73) Assignee: XIAMEN SOLEX HIGH-TECH INDUSTRIES CO., LTD., Xiamen (CN)

( * ) Notice: Subject to any disclaimer, the term of this patent is extended or adjusted under 35 U.S.C. 154(b) by 0 days.

(21) Appl. No.: 15/395,305

(22) Filed: Dec. 30, 2016

(65) Prior Publication Data
US 2018/0051816 A1  Feb. 22, 2018

(30) Foreign Application Priority Data

Aug. 17, 2016 (CN) .......................... 2016 1 0679388

(51) Int. Cl.
| | |
|---|---|
| E03C 1/04 | (2006.01) |
| F16K 11/078 | (2006.01) |
| F16K 27/04 | (2006.01) |
| F16K 31/52 | (2006.01) |
| F16K 31/60 | (2006.01) |

(52) U.S. Cl.
CPC .......... *F16K 11/078* (2013.01); *F16K 27/041* (2013.01); *F16K 31/523* (2013.01); *F16K 31/60* (2013.01); *E03C 1/0409* (2013.01)

(58) Field of Classification Search
USPC .................................................. 137/625.42
See application file for complete search history.

(56) References Cited

U.S. PATENT DOCUMENTS

| | | | | |
|---|---|---|---|---|
| 3,269,694 A | * | 8/1966 | Hardison | F16K 3/0227 251/174 |
| 4,653,535 A | * | 3/1987 | Bergmann | F16K 3/26 137/625.17 |
| 6,738,996 B1 | * | 5/2004 | Malek | B05B 1/1618 239/441 |

(Continued)

FOREIGN PATENT DOCUMENTS

CN 201051959 Y 4/2008

*Primary Examiner* — John Fox
(74) *Attorney, Agent, or Firm* — Rabin & Berdo, P.C.

(57) ABSTRACT

A waterway switch and on-off mechanism includes a fixing portion, a switch mechanism, an on-off mechanism and a driving mechanism. The driving mechanism includes a rotating base, a first sliding sleeve and a second sleeve. The rotating base has a first incline section, a first flat section, a second incline section and a second flat section; the coupling of the first incline section and the first sliding sleeve corresponds to the coupling of the second flat section and the second sliding sleeve, the rotating base drives the first sliding sleeve, the second sliding sleeve couples to the second flat section; the coupling of the second incline section and the second sliding sleeve corresponds to the coupling of the first flat section and the first sliding sleeve, the rotating base drives the second sliding sleeve, the first sliding sleeve couples to the first flat section.

18 Claims, 9 Drawing Sheets

(56) References Cited

U.S. PATENT DOCUMENTS

| | | | |
|---|---|---|---|
| 6,755,204 B2* | 6/2004 | Herbert | F16K 11/166 137/1 |
| 8,973,614 B2* | 3/2015 | Zhou | B05B 1/1609 137/625.44 |
| 9,022,057 B2* | 5/2015 | Zink | B05B 12/04 137/240 |
| 9,320,507 B2* | 4/2016 | Pribanic | A61B 17/3421 |
| 9,470,334 B2* | 10/2016 | Zhou | F16K 31/44 |

* cited by examiner

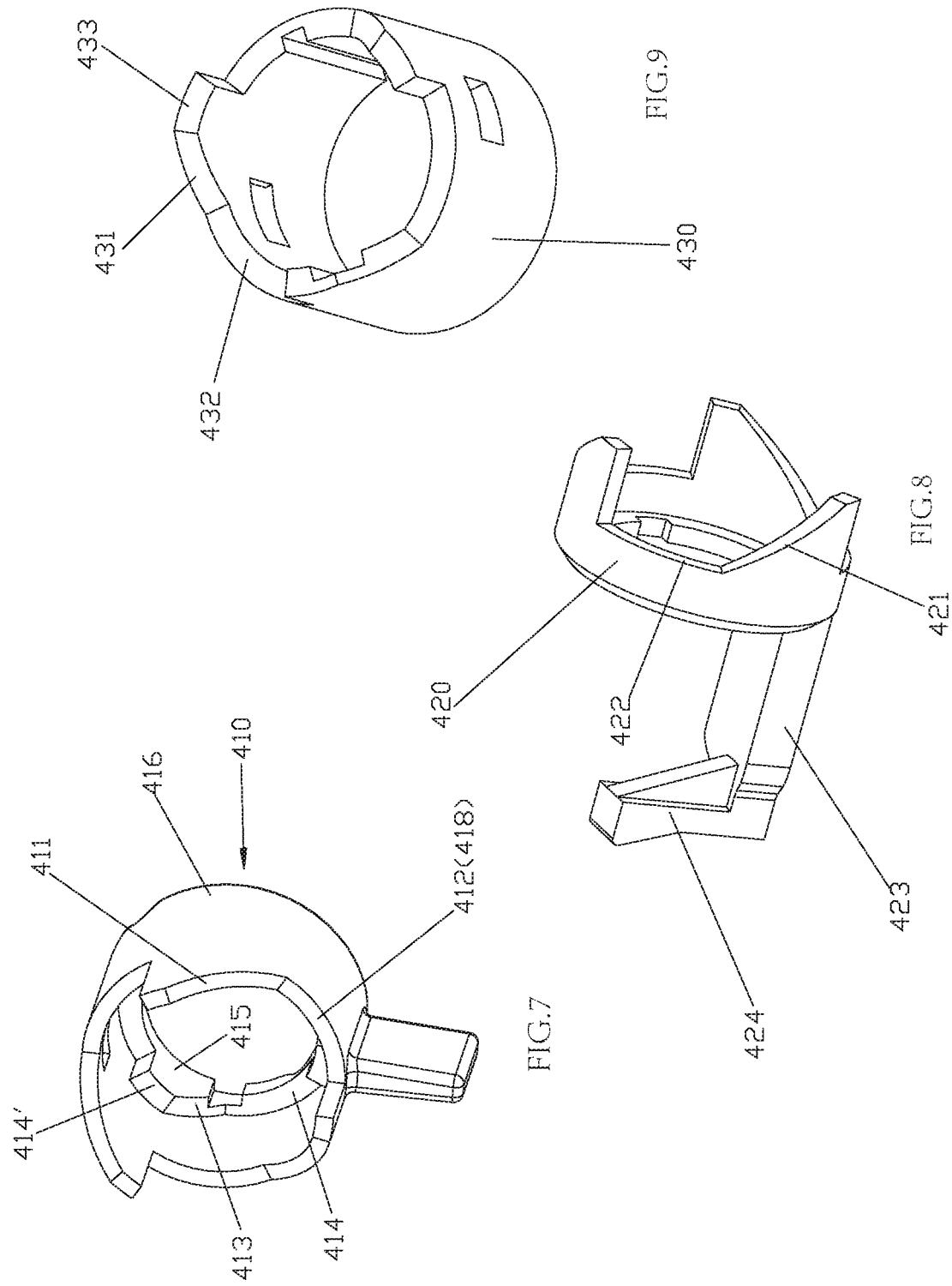

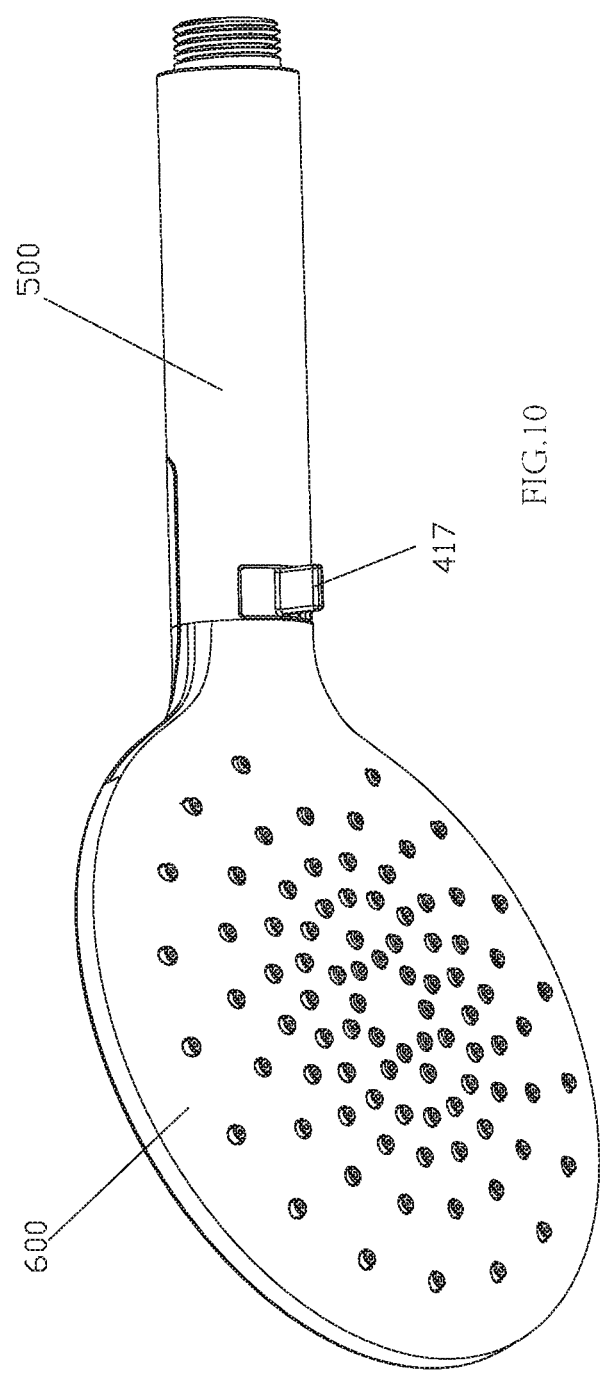

WATERWAY SWITCH AND ON-OFF MECHANISM

FIELD OF THE INVENTION

The present invention relates to a waterway switch and on-off mechanism.

BACKGROUND OF THE INVENTION

Existing waterway switch and on-off mechanism can control the waterway to turn on and turn off, also to divert different waterway to outlet waterway to realize different water type. Traditional mechanism has two independent portions: a switch mechanism and an on-off mechanism; the switch mechanism is disposed with a switch operation element, the on-off mechanism is disposed with an on-off operation element; the external of the outlet device is disposed with two operation elements for user to operate, the appearance is not attractive, the space occupied is large, the operation is not convenient.

To solve above mentioned disadvantages, the applicant provided a solution disclosed in Chinese patent database with publishing number CN201051959U, the title is a waterway cyclic switch device, which comprises a fixing portion, a switch mechanism, a driving mechanism and an adjusting base. The fixing portion is disposed with an inlet waterway and at least two diversion waterways connected to the inlet waterway. The switch mechanism is assembled in the fixing portion and comprises a diversion plate, a first transmission mechanism and a valve shaft; the diversion plate is movable with respect to the fixing portion, the valve shaft is slidable with respect to the fixing portion, the first transmission mechanism connects the diversion plate and the valve shaft, the valve shaft slides a round to drive the diversion plate to rotate a certain angle, the diversion plate rotates to switch the diversion waterways to connect to the inlet waterway. The driving mechanism comprises a rotating shaft and a second transmission mechanism, the rotating shaft is rotatably connected to the fixing portion and rotates between an initial position and a switch position; the second transmission mechanism is connected to the valve shaft in transmission way; with the second transmission mechanism, the rotating shaft rotates to drive the valve shaft to slide. The adjusting base is rotatably disposed in the fixing portion and is coupled to the inlet waterway, the adjusting base rotates with respect to the fixing portion to realize the on-off of the inlet waterway; therein, the rotating shaft rotates between the initial position and a water stop position, the initial position is disposed at the center of the switch position and the water stop position; the rotating shaft is fixedly connected to the adjusting base, when the rotating shaft rotates between the initial position and the water stop position, the second transmission mechanism works at the same time, the rotating shaft and the valve shaft are linked; when the rotating shaft rotates between the initial position and the water stop position, the second transmission mechanism doesn't work, the rotating shaft doesn't link to the valve shaft. The rotating shaft rotates between the initial position and the switch position and resets to cyclic switch the waterways, and rotates between the initial position and the water stop position to control the on-off of the waterway, the switch and water stop functions are integrally disposed, the structure is simple. This kind of driving mechanism occupies large space that it needs further improvement.

SUMMARY OF THE INVENTION

The present invention is provided with a waterway switch and on-off mechanism, which overcomes the disadvantages of the traditional technology.

The technical proposal of the present invention is that:

A waterway switch and on-off mechanism, comprising:

a fixing portion with an inlet waterway and at least two diversion waterways connected to the inlet waterway;

a switch mechanism comprising a switch element movably connected to the fixing portion and coupled to the inlet waterway and diversion waterways, the switch element is movable with respect to the fixing portion to achieve switch;

an on-off mechanism comprising a sealing element movably connected to the fixing portion and coupled to the inlet waterway, the sealing element is movable with respect to the fixing portion to control the open and close of the inlet waterway; and a driving mechanism connected to the switch element and the sealing element in transmission way;

wherein the driving mechanism comprises:

a rotating base rotatably connected to the fixing portion, the axial end face of the rotating base is disposed with a first incline section, a first flat section, a second incline section and a second flat section;

a first sliding sleeve slidably connected to the fixing portion, the first sliding sleeve is connected to the switch element in transmission way, the first sliding sleeve is coupled to the first incline section and the first flat section; and a second sliding sleeve slidably connected to the fixing portion, the second sliding sleeve is connected to the sealing element in transmission way, the second sliding sleeve is coupled to the second incline section and the second flat section;

therein, the coupling of the first incline section and the first sliding sleeve is corresponding to the coupling of the second flat section and the second sliding sleeve, the rotating base rotates to drive the first sliding sleeve to slide, the second sliding sleeve coupled to the second flat section and the second sliding sleeve keeps static; the coupling of the second incline section and the second sliding sleeve is corresponding to the coupling of the first flat section and the first sliding sleeve, the rotating base rotates to drive the second sliding sleeve to slide, the first sliding sleeve is coupled to the first flat section and the first sliding sleeve keeps static.

In another preferred embodiment, the rotating base rotates between a first position and a second position with respect to the fixing portion, an initial position is disposed between the first position and the second position; when the rotating base rotates between the initial position and the first position, the first incline section is coupled to the first sliding sleeve, the second flat section is coupled to the second sliding sleeve; when the rotating base rotates between the initial position and the second position, the second incline section is coupled to the second sliding sleeve, the first flat section is coupled to the first sliding sleeve.

In another preferred embodiment, the rotating base comprises fixedly connected an internal rotating portion and an external rotating portion arranged in the radial direction of the rotating axis of the rotating base, the axial end face of the external rotating portion is disposed with the first incline section and the first flat section, the axial end face of the internal rotating portion is disposed with the second incline section and the second flat section.

In another preferred embodiment, the first sliding sleeve surround the second sliding sleeve.

In another preferred embodiment, the rotating base is a sleeve structure and is rotatably sleeved on the fixing portion, the external periphery surface of the rotating base is fixedly disposed with a dial button.

In another preferred embodiment, the fixing portion comprises a valve body, an outlet portion fixed to one end of the valve body and an inlet portion fixed to the other end of the valve body, the diversion waterways are disposed in the outlet portion, the inlet waterway passes through the valve body from the inlet portion and connects to the outlet portion, the switch element is disposed in the outlet portion, the sealing element is disposed in the inlet portion, the rotating base is rotatably connected to the valve body.

In another preferred embodiment, the fixing portion comprises a valve body, an outlet portion fixed to one end of the valve body and an inlet portion fixed to the other end of the valve body, the diversion waterways are disposed in the outlet portion, the inlet waterway passes through the valve body from the inlet portion and connects to the outlet portion, the switch element is disposed in the outlet portion, the sealing element is disposed in the inlet portion, the rotating base is rotatably connected to the valve body; the direction of the first incline section disposed at the axial end of the external rotating portion and the direction of the second incline section disposed at the axial end of the internal rotating portion are faced to the same direction to the outlet portion.

In another preferred embodiment, a position element is slidably connected to the fixing portion, the position element is disposed with a first end face and a second end face along the sliding direction, the first end face is disposed with a position tooth, the rotating base is concaved with at least two position grooves at the position faced to the first end face, a third elastic body is disposed between the second end face of the position element and the fixing portion, the position tooth is coupled to the position grooves.

In another preferred embodiment, the end face of the first sliding sleeve faced to the axial end face of the external rotating portion is disposed with a first incline tooth, the first incline toothelike is coupled to the first incline section; the first flat section is connected to the bottom end of the first incline section.

In another preferred embodiment, the switch element is a switch plate, the switch plate is rotatably connected to the fixing portion, the switch plate rotates to switch; a first transmission mechanism is disposed between the switch plate and the first sliding sleeve, each time the first sliding sleeve slides, the first transmission mechanism drives the switch plate to rotate forwardly a preset angle; a first elastic body is disposed between the first transmission mechanism and the fixing portion or between the first sliding sleeve and the fixing portion, when the first sliding sleeve moves forwardly, the first elastic body restores energy, the first elastic body releases energy to reset the first sliding sleeve and the rotating base.

In another preferred embodiment, the first transmission mechanism comprises a pawl, a guiding block slidably connected to the fixing portion and a transmission plate coaxially fixedly connected to the switch plate, the external periphery of the transmission plate is disposed with a ratchet, the pawl is movably connected to the fixing portion, the end of the pawl abuts against the ratchet; the first sliding sleeve is connected to the guiding block in transmission way, the guiding block abuts against the pawl, the first sliding sleeve slides forwardly to drive the guiding block to slide forwardly, the guiding block slides forwardly to make the pawl to move, the end of the pawl abuts against the ratchet to drive the transmission plate to rotate forwardly a preset angle.

In another preferred embodiment, the guiding block is concaved with a through groove, the central portion of the pawl is coupled and disposed in the through groove; the fixing portion is fixedly disposed with a stop block, the portion of the pawl extending out of the through groove opposite to the side surface of the transmission plate abuts against the stop block.

In another preferred embodiment, the switch mechanism further comprises a stop claw, the stop claw is assembled to the fixing portion with the end abutting against the ratchet to limit the transmission plate to rotate backwardly.

In another preferred embodiment, the sealing element is slidably connected to the fixing portion, the sealing element slides to open and close the waterway; the second flat section comprises a second top flat section and the second bottom flat section arranged with space along the rotating axis of the rotating base, the second top flat section and the second bottom flat section are respectively connected to two ends of the second incline section.

In another preferred embodiment, a second transmission mechanism is disposed between the sealing element and the second sliding sleeve, the second transmission mechanism comprises a fixing rod fixedly connected to the second sliding sleeve and a pull rod, one end of the pull rod is fixedly connected to the fixing rod, the other end is fixedly connected to the sealing element, a second elastic body is disposed between the pull rod and the fixing portion to reset the rotating base and the second sliding sleeve.

In another preferred embodiment, the inlet waterway comprises a first waterway section, a second waterway section and a water chamber connecting the first waterway section and a second waterway section; the fixing portion is disposed with blind sliding groove, the opening of the sliding groove and the entrance of the second waterway section are faced to each other with space, the space between the sliding groove opening and the entrance of the second waterway section forms the water chamber; the sealing element comprises a sealing portion; the sealing portion is slidably connected to the sliding groove, such to control the sealing element to extend out of the opening of the sliding groove and insert into the entrance of the second waterway section in sealing way to realize disconnection or leaving away from the entrance of the second waterway section to realize connection, the second waterway section is connected to the diversion waterways.

In another preferred embodiment, the sliding groove is disposed with at least an air hole disconnected to the inlet waterway by the sealing portion and connected to the outer side of the fixing portion.

In another preferred embodiment, the sealing element further comprises a coupling portion fixedly disposed with respect to the sealing portion, the coupling portion and the sealing portion have equal water pressing area, the sealing portion is separated from the coupling portion, the coupling portion is disposed in the second waterway section.

Compared to the traditional technology, the technical proposal of the present invention has following advantages:

The driving mechanism comprises a rotating base, a first sliding sleeve and a second sliding sleeve, the rotating base is disposed with a first incline section, a first flat section, a second incline section and a second flat section, the coupling of the first incline section and the first sliding sleeve is corresponding to the coupling of the second flat section and the second sliding sleeve, the rotating base rotates to drives the first sliding sleeve to slide, the second sliding sleeve is coupled to the second flat section and the second sliding sleeve keeps static, so that the switch is achieved during the rotating, and the on-off mechanism is not influenced, the coupling of the second incline section and the second sliding sleeve is corresponding to the first flat section and the first sliding sleeve, the rotating base rotates to drive the second sliding sleeve to slide, the first sliding sleeve couples to the first flat section and the first sliding sleeve keeps static, so that the on-off control is achieved during the rotating and the switch mechanism is not influenced, the switch and the on-off of the waterway are separated, the driving mechanism is simple and compact, the arrangement is reliable, the space occupied is small, the cost is low.

The rotating base comprises an internal rotating portion and an external rotating portion fixedly connected together arranged in the radial direction of the rotating axis of the rotating base, the axial end face of the external rotating portion is disposed with a first incline section and a first flat section, the axial end face of the internal rotating portion is disposed with a second incline section and a second flat section, the arrangement is reasonable, the structure is compact, the axial distance is small.

The first sliding sleeve surrounds the second sliding sleeve, the structure is compact.

The rotating base is a sleeve body and is rotatably sleeved on the fixing portion, the external periphery surface of the rotating base is fixedly disposed with a dial button, the operation is convenient, the appearance is attractive, the structure is solid and reliable, the structure is compact.

The direction of the first incline section disposed in the axial end of the external rotating portion and the direction of the second incline section disposed in the axial end of the internal rotating portion are faced to the outlet portion, the arrangement is reliable, the structure is compact.

A third elastic body is disposed between a second end face of the position element and the fixing portion, the position tooth is coupled to the position groove, the position base is kept in rotating position by the third elastic force, the user can feel if the switch or on-off is completed by hand feeling. The operation is convenient.

The end face of the first sliding sleeve faced to the axial end face of the external rotating portion is disposed with an incline tooth, which is coupled to the first incline section, thus reducing the switch force, making it convenient to operate.

Each time the first sliding sleeve slides forwardly, the first transmission mechanism drives the switch plate to rotate forwardly a preset angle, such to achieve unidirectional circular switch, a first elastic body is disposed between the first transmission mechanism and a fixing portion or between the first sliding sleeve and the fixing portion.

The first sliding sleeve slides forwardly to drive the guiding block to slide forwardly, the guiding block slides forwardly to abut against the pawl to move, the end of the pawl abuts against the ratchet to drive the transmission plate to rotate forwardly a preset angle, with the unidirectional intermittent moving mechanism, the structure is simple.

The switch mechanism further comprises an elastic stop claw, the stop claw is assembled to the fixing portion and the end abuts against the ratchet to limit the transmission plate to rotate reversely, the structure is simple and economical.

The second top flat section and the second bottom flat section are respectively connected to two ends of the second incline section, making the sealing element keep in on or off state, avoiding the rotating base and the sealing element reset to initial state due to the second elastic body, the structure is simple.

The sealing portion is slidably connected to the sliding groove, the sealing element is controlled to extend out of the groove opening of the sliding groove and insert into the entrance of the second waterway section in sealing way to achieve disconnection or leaving away from the entrance of the second waterway section to achieve connection, thus reducing user's operation force.

The sliding groove is disposed with at least an air through hole connected to the outer side of the fixing portion separated from the inlet waterway by the sealing portion, thus reducing the operation force.

The sealing element is further disposed with a coupling portion fixed with respect to the sealing portion, the water action area of the coupling portion and the sealing portion are equal, thus reducing the operation force.

BRIEF DESCRIPTION OF THE DRAWINGS

The present invention will be further described with the drawings and embodiments.

FIG. 5 illustrates a sectional diagram of the waterway switch and on-off mechanism of the present invention when the inlet waterway is turned on.

FIG. 7 illustrates a sectional diagram of a rotating base of the present invention.

FIG. 8 illustrates a sectional diagram of a first sliding sleeve of the present invention.

FIG. 9 illustrates a sectional diagram of a second sliding sleeve of the present invention.

FIG. 10 illustrates a schematic diagram of the waterway switch and on-off mechanism of the present invention applied in a shower head.

DETAILED DESCRIPTION OF THE EMBODIMENTS

Figure 1:
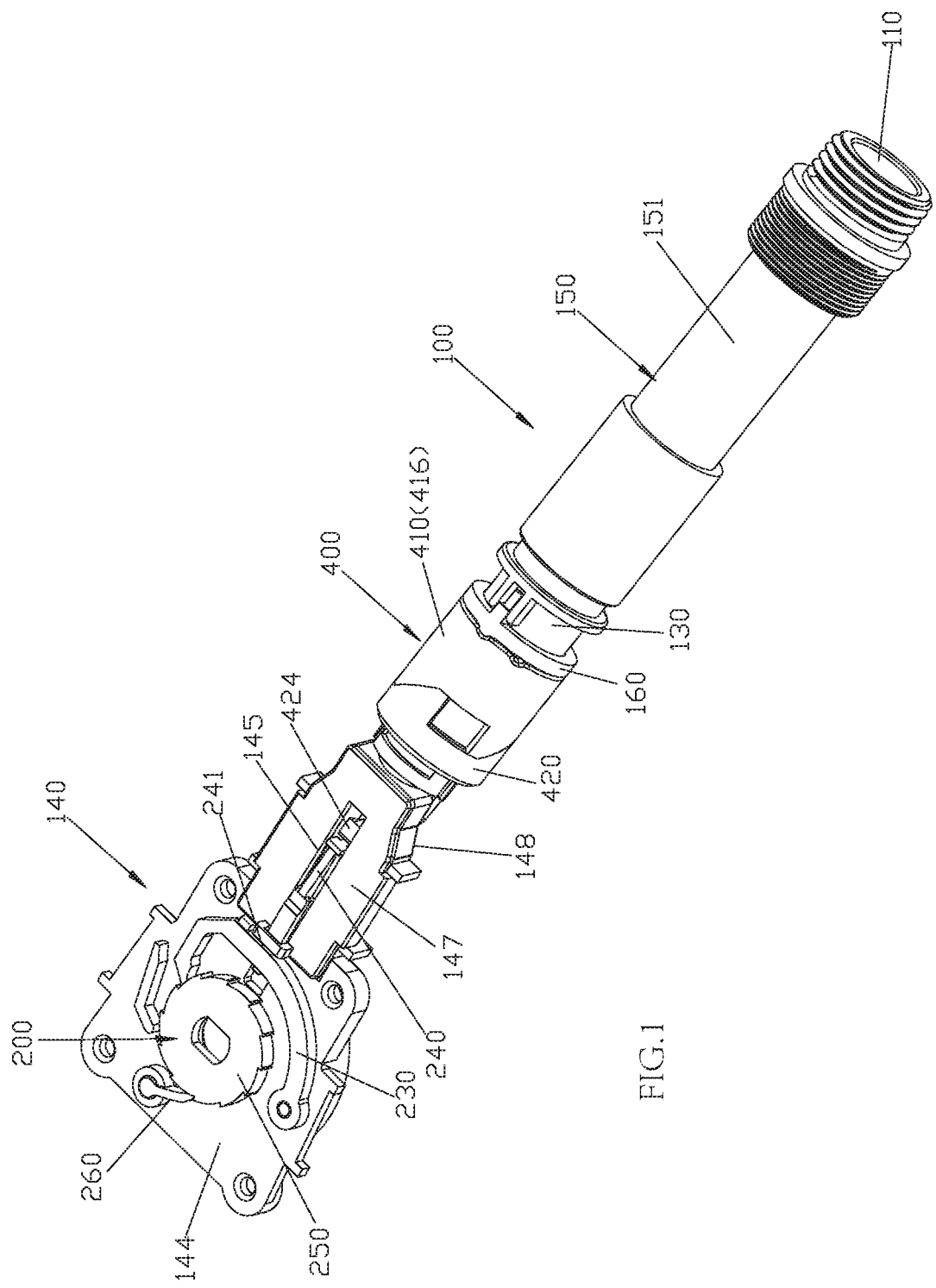
FIG. 1 illustrates a schematic diagram of a waterway switch and on-off mechanism of the present invention.
Figure 2:
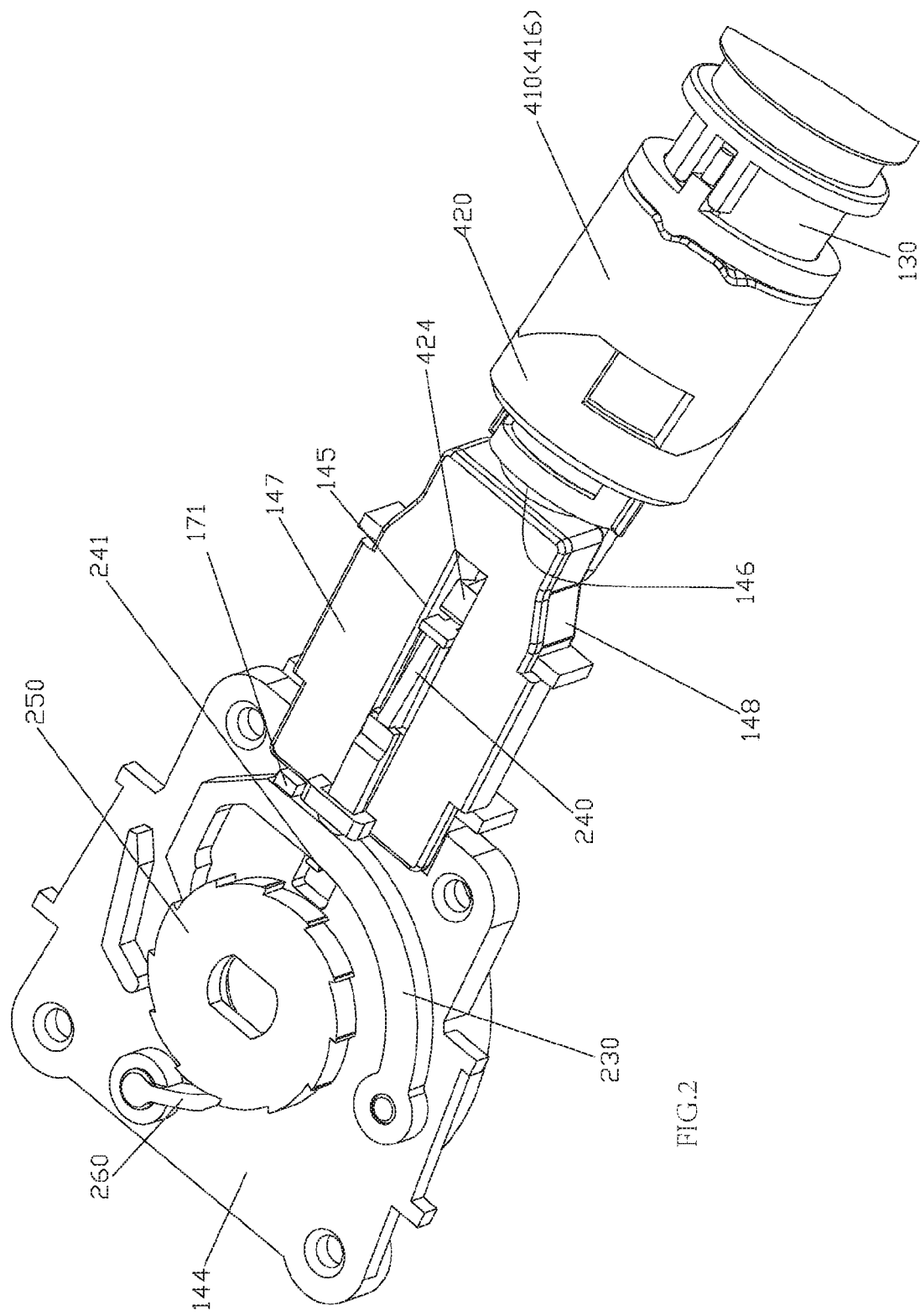
FIG. 2 illustrates a partial schematic diagram of the waterway switch and on-off mechanism of the present invention.
Figure 3:
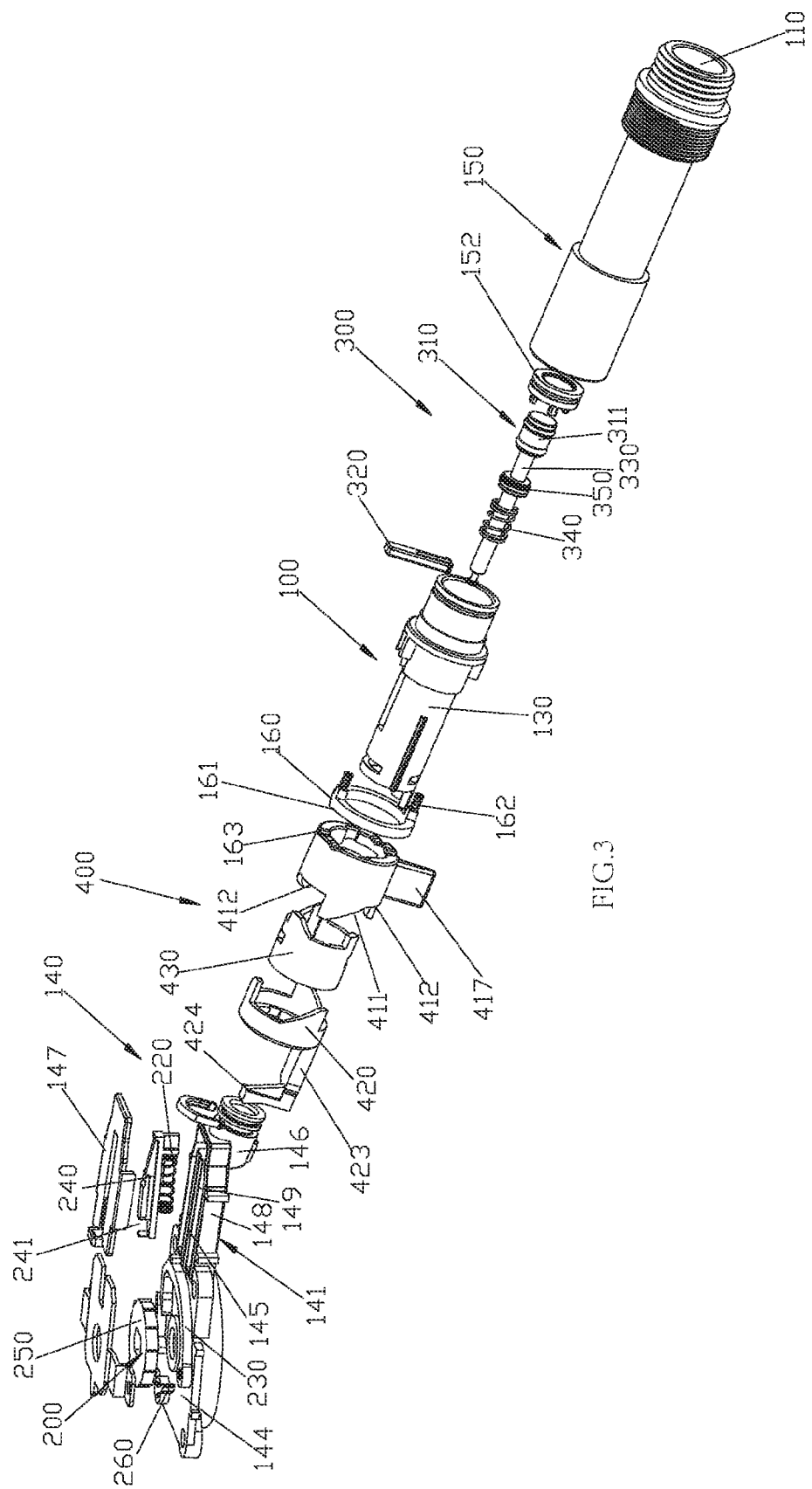
FIG. 3 illustrates an exploded and schematic diagram of the waterway switch and on-off mechanism of the present invention.
Figure 4:
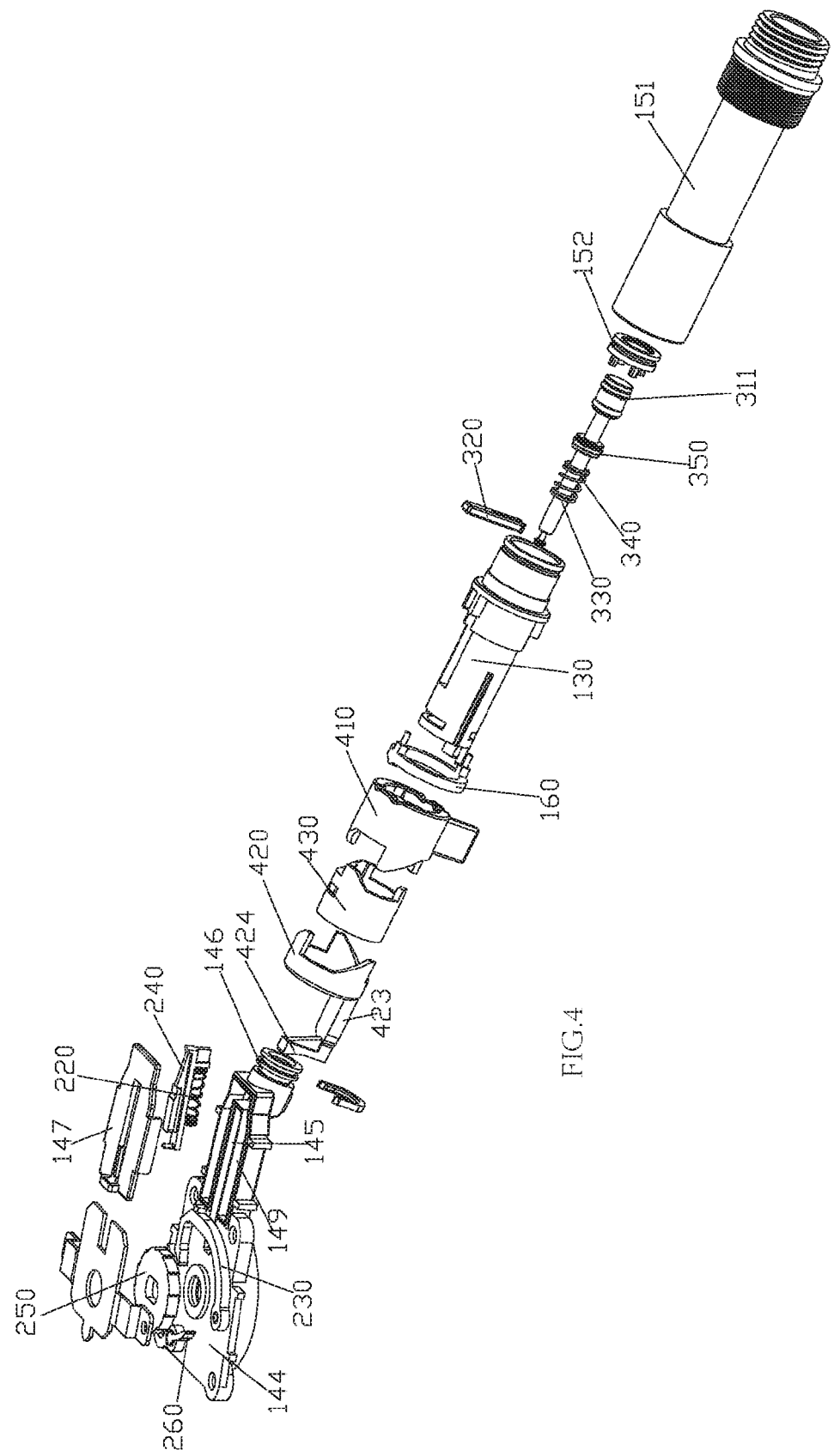
FIG. 4 illustrates an exploded and schematic diagram of the waterway switch and on-off mechanism of the present invention in another view angle.
Figure 5:
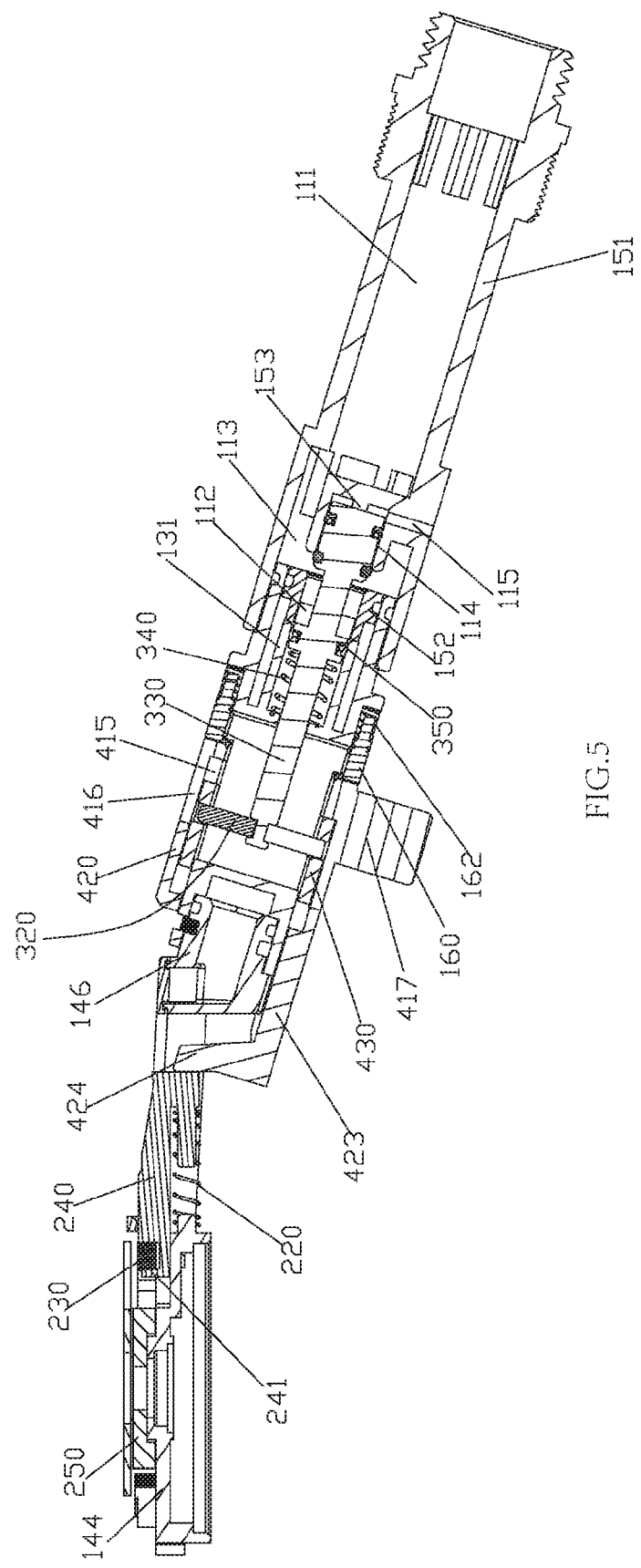
Figure 6:
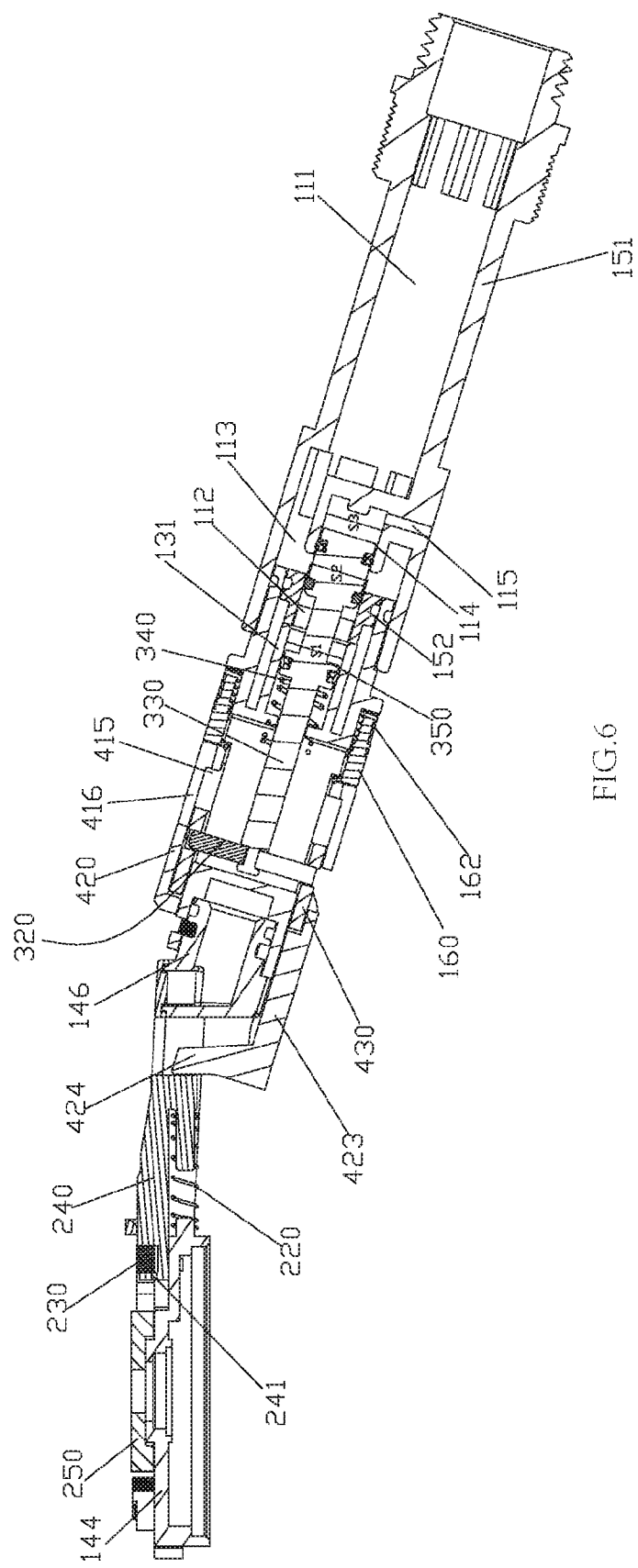
FIG. 6 illustrates a sectional diagram of the waterway switch and on-off mechanism of the present invention when the inlet waterway is turned off.
Figure 11:
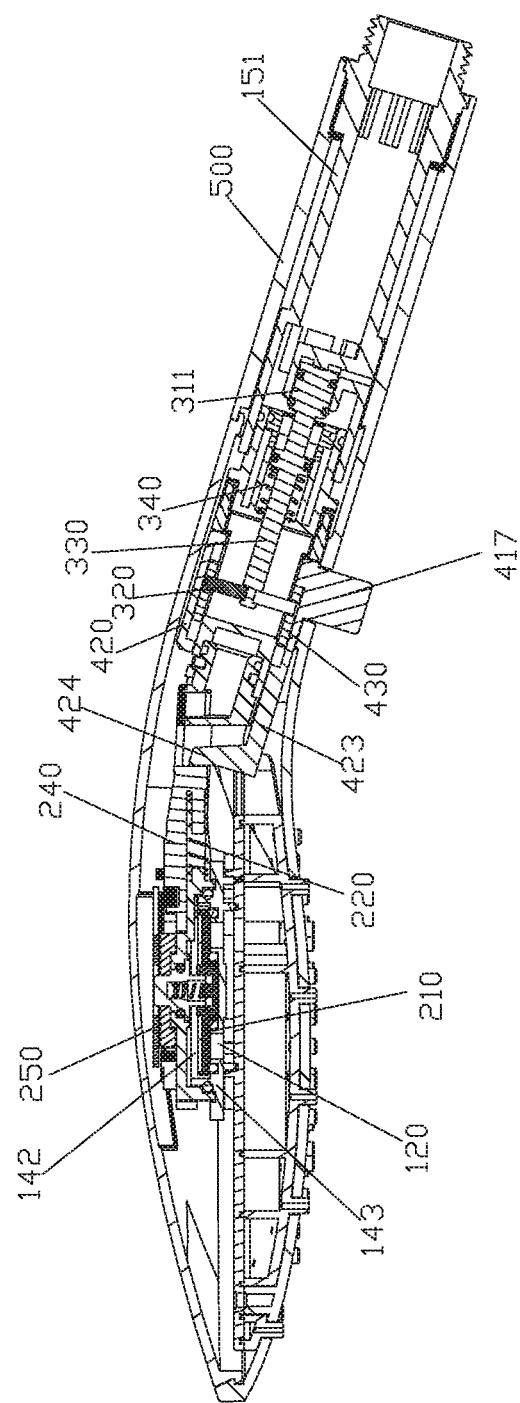
FIG. 11 illustrates a sectional diagram of the waterway switch and on-off mechanism of the present invention applied in the shower head.

Referring to FIGS. 1-11, the waterway switch and on-off mechanism comprises a fixing portion 100, a switch mechanism 200, an on-off mechanism 300 and a driving mechanism 400.

The fixing portion 100 is disposed with an inlet waterway 110 and at least two diversion waterways 120 connected to the inlet waterway 110; the number of the diversion waterways can be two, three or four. The switch mechanism 200 comprises a switch element 210 movably connected to the fixing portion 100 and coupled to the inlet waterway 110 and diversion waterways 120, the switch element 210 is movable with respect to the fixing portion 100 to achieve waterway switch; in this embodiment, the movement is rotating, but not limited to this, other method like sliding is available only if it can achieve switch. The on-off mechanism 300 comprising a sealing element 310 movably connected to the fixing portion 100 and coupled to the inlet waterway 110, the sealing element 310 is movable with respect to the fixing portion 100 to control the open and close of the inlet waterway 110; the movement is sliding, but not limited to this, other method like rotating is available only if it can achieve control.

The driving mechanism 400 comprises a rotating base 410 rotatably connected to the fixing portion 100, a first sliding sleeve 420 slidably connected to the fixing portion 100 and a second sliding sleeve 430 slidably connected to the fixing portion 100. The axial end face of the rotating base 410 is disposed with a first incline section 411, a first flat section 412, a second incline section 413 and a second flat section 414. The first sliding sleeve 420 is connected to the switch element 210 in transmission way, such that the first sliding sleeve 420 slides to drive the switch element 210 to rotate to achieve waterway switch, the first sliding sleeve 420 is coupled to the first incline section 411 and the first flat section 412. The second sliding sleeve 430 is connected to the sealing element 310 in transmission way, such that the second sliding sleeve 430 slides to drive the sealing element 310 to slide to achieve open and close the waterway, the second sliding sleeve 430 is coupled to the second incline section 413 and the second flat section 414. Therein, the coupling of the first incline section 411 and the first sliding sleeve 420 is corresponding to the coupling of the second flat section 414 and the second sliding sleeve 430, therefore, when the first incline section 411 is coupled to the first sliding sleeve 420, the second flat section 414 is coupled to the second sliding sleeve 430; the rotating base 410 rotates to drive the first sliding sleeve 420 to slide, the second sliding sleeve 430 is coupled to the second flat section 414 and the second sliding sleeve 430 keeps static; the coupling of the second incline section 413 and the second sliding sleeve 430 is corresponding to the coupling of the first flat section 412 and the first sliding sleeve 420, therefore, when the second incline section 413 is coupled to the second sliding sleeve 430, the first flat section 412 is coupled to the first sliding sleeve 420; the rotating base 410 rotates to drive the second sliding sleeve 430 to slide, the first sliding sleeve 420 is coupled to the first flat section 412 and the first sliding sleeve 420 keeps static.

The rotating base 410 rotates between a first position and a second position with respect to the fixing portion 100, an initial position is disposed between the first position and the second position; when the rotating base 410 rotates between the initial position and the first position, the first incline section 411 is coupled to the first sliding sleeve 420, the second flat section is coupled to the second sliding sleeve, that is to say, when the rotating base 410 rotates between the initial position and the first position, it controls the first sliding sleeve to slide and controls the switch element to move to achieve waterway switch, the second sliding sleeve keeps static; when the rotating base 410 rotates between the initial position and the second position, the second incline section is coupled to the second sliding sleeve, the first flat section is coupled to the first sliding sleeve, that is to say, when the rotating base 410 rotates between the initial position and the second position, it controls the second sliding sleeve to slide and controls the sealing element to move to achieve open and close the waterway, the first sliding sleeve keeps static.

In a detailed structure, the rotating base 410 is a sleeve structure and comprises an internal rotating portion 415 and an external rotating portion 416 arranged in the radial direction of the rotating axis of the rotating base 410 and fixedly connected, the axial end face of the external rotating portion 416 is disposed with the first incline section and the first flat section, the first flat section is connected to the bottom portion of the first incline section; the axial end face of the internal rotating portion 415 is disposed with the second incline section and the second flat section, the second flat section is connected to the bottom portion of the second incline section. The rotating base 410 is rotatably sleeved on the fixing portion 100, the external periphery surface of the rotating base 410 is fixedly disposed with a dial button 417. The first sliding sleeve 420 surrounds the second sliding sleeve 430, such to save space, the structure is compact, the appearance is attractive. The direction of the first incline section 411 disposed at the axial end of the external rotating portion and the direction of the second incline section disposed at the axial end of the internal rotating portion are faced to the same direction to the outlet portion.

The end face of the first sliding sleeve 420 faced to the axial end face of the external rotating portion is disposed with a first incline tooth 421, the first incline toothelike 421 is coupled to the first incline section 411, a first bottom concave portion 422 is formed between two adjacent first incline teeth 421. A first coupling concave portion 418 coupling to the first flat section is formed between two adjacent first incline sections of the axial end portion of the external rotating portion 416. The first incline tooth 421 is inserted to the first coupling concave portion 418, when rotating between the initial position and the first position, the first incline tooth is coupled to the first incline section, such that the rotating base rotates to drive the first sliding sleeve to slide, when rotating between the initial position and the second position, the first incline tooth is coupled to the first flat section, the first incline section is coupled to the first bottom concave portion, the first sliding sleeve keeps static.

The end face of the second sliding sleeve 430 faced to the axial end face of the internal rotating portion is disposed with a second incline tooth 431, a second bottom concave portion 432 is formed between two adjacent second incline teeth 431, the top end of the second incline tooth 431 forms a third flat section 433, the second incline tooth 431 is coupled to the second incline section 413. A second coupling concave portion coupling to the second flat section is formed between two adjacent second incline sections of the axial end portion of the internal rotating portion 415. The second incline tooth 431 is inserted to the second coupling concave portion, when rotating between the initial position and the second position, the second incline tooth is coupled to the second incline section, such that the rotating base rotates to drive the second sliding sleeve to slide; when in the second position, the second bottom flat section 414 is contacted with the third flat section 433; when rotating between the initial position and the first position, the second incline tooth is coupled to the second flat section, the second incline section is coupled to the second bottom concave portion 432, the second sliding sleeve keeps static.

The fixing portion 100 comprises a valve body 130, an outlet portion 140 fixed to one end of the valve body 130 and an inlet portion 150 fixed to the other end of the valve body 140, the diversion waterways 120 are disposed in the outlet portion 140, the inlet waterway 110 passes through the valve body from the inlet portion and connects to the outlet portion, the switch element 210 is disposed in the outlet portion 140, the sealing element 310 is disposed in the inlet portion 150, the rotating base 410 is rotatably connected to the valve body 130.

The outlet portion 140 comprises a water diversion body portion and a water connecting portion 141, the water diversion body portion is disposed with a water diversion chamber 142, the water diversion body portion is disposed above mentioned diversion waterways, the entrance of the diversion waterways are disposed on the chamber bottom surface of the water diversion chamber, the entrances are arranged evenly with space in an arc line. The water diversion body comprises a main body 143 and a first cover plate 144, the main body is disposed with above mentioned diversion waterways, the top surface of the main body is concaved with a water diversion groove, the first cover plate 144 is fixedly covered on the main body in sealing way, the water diversion groove forms the water diversion chamber. One end of the water connecting portion is connected to the water diversion chamber and forms a portion of the inlet waterway.

The switch element 210 is a switch plate, which is disposed in the water diversion chamber 142 and contacted on the bottom surface of the water diversion chamber 142, the switch plate is rotatably connected to the main body 143 of the fixing portion, the switch plate 210 is disposed with a water flowing portion, the water flowing portion is aligned to the entrance of the diversion waterways or staggered to achieve switch, the water flowing portion is a through hole or a concaved notch. A first transmission mechanism is disposed between the switch plate 210 and the first sliding sleeve 420, each time the first sliding sleeve 420 slides, the first transmission mechanism drives the switch plate 210 to rotate forwardly a preset angle; in this embodiment, the first transmission mechanism is applied with unidirectional intermittent moving mechanism, such as ratchet wheel-pawl mechanism, but not limited to this, other structures like gear-rack structure are available as needed, the rack slides to drive the gear to rotate to switch, the rack is disposed in the first sliding sleeve or a sliding block (a guiding block slidably connected to the fixing portion) driven by the first sliding sleeve, the gear is disposed in the switch plate or in another gear (a transmission plate coaxially fixedly connected to the switch plate) driven by the switch plate. A first elastic body 220 is disposed between the first transmission mechanism and the fixing portion 100 or between the first sliding sleeve 420 and the fixing portion 100, when the rotating base 410 is in the initial position, the first elastic body 220 is pre-compressed, when the first sliding sleeve 420 moves forwardly, the first elastic body 220 further restores energy, the first elastic body 220 releases energy to reset the first sliding sleeve 420 and the rotating base 410. As the first elastic body is pre-compressed in the initial position, when the rotating base 410 resets to near to the initial position by the elastic body, the elastic body still has enough elastic force to overcome the friction force between the incline section and the incline tooth so as to push the rotating base 410 to reset to the initial position. The first cover plate 144 is fixedly disposed with a stop block 171, the portion of the pawl extending out of the through groove opposite to the side surface of the transmission plate abuts against the stop block. The pre-tightening force of the pre-compressed first elastic body 220 is transmitted to the stop block by the guiding block 240 and the pawl 230, making the rotating base 410 reset correctly to the initial position but not biasing to the second position exceeding the initial position; when the rotating base 410 rotates between the initial position and the second position, the pre-tightening force of the first elastic body 220 acts on the stop block, no other force exists to act to the rotating base 410 to influence the switch operation. The first transmission mechanism comprises a pawl 230, a guiding block 240 slidably connected to the first cover plate 144 of the fixing portion 100 and a transmission plate 250 coaxially fixedly connected to the switch plate.

A fixing shaft is coaxially fixedly connected to the switch plate 210, the entrance of the diversion waterways are arranged evenly with space in the arc with the center of circle in the fixing shaft, the fixing shaft can rotatably extend out of the water diversion chamber, like the first cover plate, the transmission plate can sleeve coaxially rotatably on the extending portion of the fixing shaft, it can be directly fixed or make the transmission plate and the switch plate relatively coaxially fixed after the product is assembled. The external periphery of the transmission plate 250 is disposed with a ratchet, one end of the pawl 230 is rotatably connected to the first cover plate 144 of the fixing portion, the other end of the pawl 230 abuts against the ratchet; the first sliding sleeve 420 abuts against the guiding block 240, the guiding block 240 abuts against the pawl, the first sliding sleeve 420 slides forwardly to drive the guiding block 240 to slide forwardly, the guiding bock 240 slides forwardly to abut against the pawl 230 to move, the end of the pawl 230 abuts against the ratchet to drive the transmission plate 250 to rotate forwardly a certain angle. Preferred, the switch mechanism further comprises an elastic stop claw 260, the stop claw 260 is assembled to the fixing portion with the end abutting against the ratchet to limit the transmission plate 250 to rotate backwardly. When the transmission plate 250 rotates forwardly, the ratchet moves to make the stop claw 260 elastically deformed, the stop claw 260 doesn't limit the transmission plate 250 to rotate forwardly. The end portion of the first sliding sleeve opposite to the rotating base is fixedly disposed with a fixing rod 423, the end of the fixing rod 423 is fixedly connected to an abutting portion 424, the abutting portion 424 and the first sliding sleeve 420 are arranged with space. The water connecting portion 141 is disposed with a coupling groove 145 passing through from up to down, the guiding block 240 is slidably connected to the coupling groove 145, the guiding block 240 is concaved with an assembly groove 241, the central portion of the pawl 230 is placed in the assembly groove 241 in coupling way. One side of the first cover plate is fixedly disposed with a fixed portion 148, the top surface of the fixed portion is concaved with a through groove, the fixed portion is disposed with two concaved water grooves 149 disposed at two sides of the through groove respectively, one end of the water groove is connected to the water diversion chamber, the other end is connected to a joint 146 fixedly connected to the fixed portion, the fixed portion is disposed between the joint 146 and the first cover plate; a second cover plate 147 is further disposed, the second cover plate is fixedly covered on the fixed portion in sealing way, making the water groove form a portion of the water connecting portion, form a portion of the inlet waterways; the second cover plate 147 is disposed with a second groove coupling to the through groove, the through groove and the second groove form the coupling groove 145.

In this embodiment, the switch mechanism drives the first sliding sleeve to slide by the rotating of the rotating base, the first sleeve slides to drive the switch plate to rotate to switch by the first transmission mechanism, but not limited to this, sliding to switch is available as needed, for example, the switch element is slidable with respect to the fixing portion, the first sliding sleeve slides to drive the switch element to slide.

A second transmission mechanism is disposed between the sealing element 310 and the second sliding sleeve 430, the second transmission mechanism comprises a fixing rod 320 fixedly connected to the second sliding sleeve 430 and a pull rod 330, one end of the pull rod 330 is fixedly connected to the fixing rod 320, the other end is fixedly connected to the sealing element 310, a second elastic body 340 is disposed between the pull rod and the fixing portion to reset the rotating base and the second sliding sleeve. When the rotating base 410 is in the initial position, the second elastic body is pre-compressed, such that the rotating base can precisely reset to the initial state, the principle is similar to the pre-compressed first elastic body 220, therefore, it would not be further described. The end of the fixing rod is disposed with a slot, the periphery of the end is protruding outwardly with a lock flange, the periphery of the head end is protruding with a flange; the second sliding sleeve is disposed with two through grooves axially symmetrically arranged and passing through inside and outside; the end of the fixing rod is elastic due to the slot, the end of the fixing rod deforms and passes through the two through grooves, and resets after passing through the grooves, therefore, the flange and the lock flange are contacted with the external wall of the second sliding sleeve, such to fixedly connect the fixing rod and the second sliding sleeve. One end of the pull rod 330 is disposed with an annular groove, the pull rod enters the slot from the opening of the slot and the annular groove is locked to the fixing rod, such to fixedly connect the pull rod and the fixing rod.

The second flat section comprises a second top flat section 414 and the second bottom flat section 414', which are respectively connected to two ends of the second incline section.

The inlet waterway 110 comprises a first waterway section 111, a second waterway section 112 and a water chamber 113 connecting the first waterway section 111 and a second waterway section 112; the fixing portion is disposed with blind sliding groove 114, the opening of the sliding groove 114 and the entrance of the second waterway section 112 are faced to each other with space, the space between the sliding groove opening and the entrance of the second waterway section forms the water chamber; the sealing element 310 comprises a sealing portion 311; the sealing portion 311 is slidably connected to the sliding groove, such to control the sealing element to extend out of the opening of the sliding groove and insert into the entrance of the second waterway section in sealing way to realize disconnection or leaving away from the entrance of the second waterway section to realize connection, the second waterway section is connected to the diversion waterways, and is connected to the joint 146. Preferred, the sliding groove 114 is disposed with at least an air hole 115 disconnected to the inlet waterway by the sealing portion and connected to the outer side of the fixing portion, such to balance the pressure at two sides, when switched to the water supplying state, with the air holes, it avoids switch failure due to increased air pressure when the sliding groove is compressed. The sealing element comprises a coupling portion 350 fixedly connected to the pull rod and fixed with respect to the sealing portion, the pressure area of the coupling portion and the sealing portion are equal, the sealing portion and the coupling portion are separated, the coupling portion is disposed in the second waterway section. As S2=S3, the sealing portion doesn't be influenced by water pressure, therefore, the needed elastic force of the second elastic body is slight when switching from the water stop state to water supplying state; as S1=S3, the switch force needed to switch from the water supplying state to water stop state is slight, the air hole is benefit for the sealing portion to reset from the water stop state to water supplying state under the action of the second elastic body.

The inlet portion 150 comprises a hollow spindle 151, one end of the spindle 151 is fixedly disposed with a cup body with cup opening faced to the end, the cup body is formed with above mentioned sliding groove 114, the air hole is connected to the external wall of the spindle, a water passage of the first waterway section is formed between the cup opening and the spindle 151. One end of the valve body is fixedly disposed with an internal ring 131, the internal ring 131 and the end of the valve body are arranged with space inside and outside; the end of the valve body is fixedly connected to one end of the spindle 151 in sealing way; an annular sealing pad 152 is further configured, the end face of the sealing pad is protruding with a plurality of protrusions arranged in periphery with space, the end face of the protrusion is contacted with the end face of the annular ring in sealing way. The inner hole of the sealing pad forms the entrance of the second waterway section. The waterway is from the inner hole of the sealing pad, the space between two protrusions, the space between the inner hole and the end of the valve body to the valve body, and from the valve body to the joint. The annular ring is disposed with a bottom portion opposite to the end of the valve body, the second elastic body is disposed between the bottom portion and the coupling portion, the pull rod passes through the bottom portion, the second elastic body is sleeved on the pull rod. The spindle is disposed with a protruding block 153 at the position corresponding to the bottom portion of the cup body, the pre-tightening force of the second elastic body 340 is applied on the protruding block, making the rotating base 410 reset precisely to the initial position but not be pulled by the pre-compressed second elastic body to the first position exceeding the initial position; at the same time, when the rotating base 410 rotates between the initial position and the first position, the pre-tightening force of the second elastic body 340 is acted on the protruding block not the rotating base 410 by the fixing rod 320 and the second sliding sleeve 430, therefore, the switch processing would not be influenced by the extra force due to the pre-compressing of the second elastic body 340.

A position element 160 is slidably connected to the fixing portion 100, the position element 160 is disposed with a first end face and a second end face along the sliding direction, the first end face is disposed with a position tooth 161, the rotating base 410 is concaved with at least two position grooves 163 at the position faced to the first end face, a third elastic body 162 is disposed between the second end face of the position element and the fixing portion, the position tooth is coupled to the position grooves.

Rotating the dial button 417 in clockwise direction, the rotating base rotates from the initial position to the first position, the first incline section 411 of the rotating base 410 is engaged to the first incline tooth of the first sliding sleeve 420, so that the first sliding sleeve 420 moves left, the first transmission mechanism (the ratchet wheel-pawl mechanism) moves unidirecitonally and intermittently to drive the switch plate 210 to rotate forwardly to achieve waterway switch, a function resettable cyclic switch; at this time, the second sliding sleeve of the on-off mechanism is coupled to the second flat section, the second sliding sleeve keeps static, after switched to the position, the first elastic body releases the energy to reset the first transmission mechanism, the first sliding sleeve and the rotating base. Rotating the dial button 417 in counter-clockwise direction, the rotating base rotates from the initial position to the second position, the second incline section 413 of the rotating base 410 is engaged to the second incline tooth of the second sliding sleeve 430, the second sliding sleeve 430 moves left to drive the sealing portion to close the entrance of the second waterway section, such to achieve water stop switch, at this time, the second top flat section 414 is coupled to the third flat section 433 of the second sliding sleeve, the mechanism keeps in water stop state, the first sliding sleeve of the switch mechanism is coupled to the first flat section, the first sliding sleeve keeps static; rotating the dial button 417 in clockwise direction, the rotating base rotates from the second position to the initial position, the second elastic body releases energy to reset the pull rod and the sealing portion.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A waterway switch and on-off mechanism, comprising:
   a fixing portion with an inlet waterway and at least two diversion waterways connected to the inlet waterway;
   a switch mechanism comprising a switch element movably connected to the fixing portion and coupled to the inlet waterway and diversion waterways, the switch element is movable with respect to the fixing portion to achieve switch;
   an on-off mechanism comprising a sealing element movably connected to the fixing portion and coupled to the inlet waterway, the sealing element is movable with respect to the fixing portion to control the open and close of the inlet waterway; and
   a driving mechanism connected to the switch element and the sealing element in transmission way;
   wherein the driving mechanism comprises:
   a rotating base rotatably connected to the fixing portion, the axial end face of the rotating base is disposed with a first incline section, a first flat section, a second incline section and a second flat section;
   a first sliding sleeve slidably connected to the fixing portion, the first sliding sleeve is connected to the switch element in transmission way, the first sliding sleeve is coupled to the first incline section and the first flat section; and
   a second sliding sleeve slidably connected to the fixing portion, the second sliding sleeve is connected to the sealing element in transmission way, the second sliding sleeve is coupled to the second incline section and the second flat section;
   therein, the coupling of the first incline section and the first sliding sleeve is corresponding to the coupling of the second flat section and the second sliding sleeve, the rotating base rotates to drive the first sliding sleeve to slide, the second sliding sleeve coupled to the second flat section and the second sliding sleeve keeps static; the coupling of the second incline section and the second sliding sleeve is corresponding to the coupling of the first flat section and the first sliding sleeve, the rotating base rotates to drive the second sliding sleeve to slide, the first sliding sleeve is coupled to the first flat section and the first sliding sleeve keeps static.

2. The waterway switch and on-off mechanism according to claim 1, wherein the rotating base rotates between a first position and a second position with respect to the fixing portion, an initial position is disposed between the first position and the second position; when the rotating base rotates between the initial position and the first position, the first incline section is coupled to the first sliding sleeve, the second flat section is coupled to the second sliding sleeve; when the rotating base rotates between the initial position and the second position, the second incline section is coupled to the second sliding sleeve, the first flat section is coupled to the first sliding sleeve.

3. The waterway switch and on-off mechanism according to claim 1, wherein the rotating base comprises fixedly connected an internal rotating portion and an external rotating portion arranged in the radial direction of the rotating axis of the rotating base, the axial end face of the external rotating portion is disposed with the first incline section and the first flat section, the axial end face of the internal rotating portion is disposed with the second incline section and the second flat section.

4. The waterway switch and on-off mechanism according to claim 3, wherein the first sliding sleeve surround the second sliding sleeve.

5. The waterway switch and on-off mechanism according to claim 3, wherein the fixing portion comprises a valve body, an outlet portion fixed to one end of the valve body and an inlet portion fixed to the other end of the valve body, the diversion waterways are disposed in the outlet portion, the inlet waterway passes through the valve body from the inlet portion and connects to the outlet portion, the switch element is disposed in the outlet portion, the sealing element is disposed in the inlet portion, the rotating base is rotatably connected to the valve body;
   the direction of the first incline section disposed at the axial end of the external rotating portion and the direction of the second incline section disposed at the axial end of the internal rotating portion are faced to the same direction to the outlet portion.

6. The waterway switch and on-off mechanism according to claim 3, wherein the end face of the first sliding sleeve faced to the axial end face of the external rotating portion is disposed with a first incline tooth, the first incline toothelike is coupled to the first incline section; the first flat section is connected to the bottom end of the first incline section.

7. The waterway switch and on-off mechanism according to claim 1, wherein the rotating base is a sleeve structure and is rotatably sleeved on the fixing portion, the external periphery surface of the rotating base is fixedly disposed with a dial button.

8. The waterway switch and on-off mechanism according to claim 1, wherein the fixing portion comprises a valve body, an outlet portion fixed to one end of the valve body and an inlet portion fixed to the other end of the valve body, the diversion waterways are disposed in the outlet portion, the inlet waterway passes through the valve body from the inlet portion and connects to the outlet portion, the switch element is disposed in the outlet portion, the sealing element is disposed in the inlet portion, the rotating base is rotatably connected to the valve body.

9. The waterway switch and on-off mechanism according to claim 1, wherein a position element is slidably connected to the fixing portion, the position element is disposed with a first end face and a second end face along the sliding direction, the first end face is disposed with a position tooth, the rotating base is concaved with at least two position grooves at the position faced to the first end face, a third elastic body is disposed between the second end face of the position element and the fixing portion, the position tooth is coupled to the position grooves.

10. The waterway switch and on-off mechanism according to claim 1, wherein the switch element is a switch plate, the switch plate is rotatably connected to the fixing portion, the switch plate rotates to switch; a first transmission mechanism is disposed between the switch plate and the first sliding sleeve, each time the first sliding sleeve slides, the first transmission mechanism drives the switch plate to rotate forwardly a preset angle; a first elastic body is disposed between the first transmission mechanism and the fixing portion or between the first sliding sleeve and the fixing portion, when the first sliding sleeve moves forwardly, the first elastic body restores energy, the first elastic body releases energy to reset the first sliding sleeve and the rotating base.

11. The waterway switch and on-off mechanism according to claim 10, wherein the first transmission mechanism comprises a pawl, a guiding block slidably connected to the fixing portion and a transmission plate coaxially fixedly connected to the switch plate, the external periphery of the transmission plate is disposed with a ratchet, the pawl is movably connected to the fixing portion, the end of the pawl abuts against the ratchet; the first sliding sleeve is connected to the guiding block in transmission way, the guiding block abuts against the pawl, the first sliding sleeve slides forwardly to drive the guiding block to slide forwardly, the guiding block slides forwardly to make the pawl to move, the end of the pawl abuts against the ratchet to drive the transmission plate to rotate forwardly a preset angle.

12. The waterway switch and on-off mechanism according to claim 11, wherein the guiding block is concaved with a through groove, the central portion of the pawl is coupled and disposed in the through groove; the fixing portion is fixedly disposed with a stop block, the portion of the pawl extending out of the through groove opposite to the side surface of the transmission plate abuts against the stop block.

13. The waterway switch and on-off mechanism according to claim 11, wherein the switch mechanism further comprises a stop claw, the stop claw is assembled to the fixing portion with the end abutting against the ratchet to limit the transmission plate to rotate backwardly.

14. The waterway switch and on-off mechanism according to claim 1, wherein the sealing element is slidably connected to the fixing portion, the sealing element slides to open and close the waterway; the second flat section comprises a second top flat section and the second bottom flat section arranged with space along the rotating axis of the rotating base, the second top flat section and the second bottom flat section are respectively connected to two ends of the second incline section.

15. The waterway switch and on-off mechanism according to claim 14, wherein a second transmission mechanism is disposed between the sealing element and the second sliding sleeve, the second transmission mechanism comprises a fixing rod fixedly connected to the second sliding sleeve and a pull rod, one end of the pull rod is fixedly connected to the fixing rod, the other end is fixedly connected to the sealing element, a second elastic body is disposed between the pull rod and the fixing portion to reset the rotating base and the second sliding sleeve.

16. The waterway switch and on-off mechanism according to claim 14, wherein the inlet waterway comprises a first waterway section, a second waterway section and a water chamber connecting the first waterway section and a second waterway section; the fixing portion is disposed with blind sliding groove, the opening of the sliding groove and the entrance of the second waterway section are faced to each other with space, the space between the sliding groove opening and the entrance of the second waterway section forms the water chamber; the sealing element comprises a sealing portion; the sealing portion is slidably connected to the sliding groove, such to control the sealing element to extend out of the opening of the sliding groove and insert into the entrance of the second waterway section in sealing way to realize disconnection or leaving away from the entrance of the second waterway section to realize connection, the second waterway section is connected to the diversion waterways.

17. The waterway switch and on-off mechanism according to claim 16, wherein the sliding groove is disposed with at least an air hole disconnected to the inlet waterway by the sealing portion and connected to the outer side of the fixing portion.

18. The waterway switch and on-off mechanism according to claim 16, wherein the sealing element further comprises a coupling portion fixedly disposed with respect to the sealing portion, the coupling portion and the sealing portion have equal water pressing area, the sealing portion is separated from the coupling portion, the coupling portion is disposed in the second waterway section.

\* \* \* \* \*